(12) United States Patent
LaCourse et al.

(10) Patent No.: US 8,460,578 B2
(45) Date of Patent: *Jun. 11, 2013

(54) RARE EARTH OXYSULFIDE SCINTILLATOR AND METHODS FOR PRODUCING SAME

(75) Inventors: Brian C. LaCourse, Pepperell, MA (US); Morteza Zandi, Webster, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 515 days.

This patent is subject to a terminal disclaimer.

(21) Appl. No.: 12/419,162

(22) Filed: Apr. 6, 2009

(65) Prior Publication Data
US 2009/0189121 A1    Jul. 30, 2009

Related U.S. Application Data

(63) Continuation of application No. 11/488,905, filed on Jul. 18, 2006, now Pat. No. 7,531,109.

(60) Provisional application No. 60/702,330, filed on Jul. 25, 2005.

(51) Int. Cl.
*C09K 11/84* (2006.01)

(52) U.S. Cl.
USPC .................... 252/301.4 S; 501/152

(58) Field of Classification Search
USPC .......... 252/301.4 S; 250/361 R, 367; 501/152
See application file for complete search history.

(56) References Cited

U.S. PATENT DOCUMENTS

| | | |
|---|---|---|
| 4,518,545 A | 5/1985 | Cusano et al. |
| 4,518,546 A | 5/1985 | Greskovich et al. |
| 4,571,312 A | 2/1986 | Greskovich et al. |
| 4,747,973 A | 5/1988 | Cusano et al. |
| 5,296,163 A | 3/1994 | Leppert et al. |
| 5,318,722 A | 6/1994 | Tsoukala et al. |
| 5,562,860 A | 10/1996 | Grabmaier et al. |
| 5,640,016 A | 6/1997 | Matsuda et al. |
| 5,676,891 A | 10/1997 | Boedinger |
| 6,323,489 B1 | 11/2001 | McClellan |
| 6,384,417 B1 | 5/2002 | Okumura et al. |
| 6,504,156 B1 | 1/2003 | Takahara et al. |
| 7,531,109 B2 * | 5/2009 | LaCourse et al. ....... 252/301.4 S |

FOREIGN PATENT DOCUMENTS

| | | |
|---|---|---|
| EP | 166566 A | 1/1986 |
| EP | 0419847 A | 4/1991 |
| EP | 1028154 A1 | 8/2000 |
| JP | 59-030883 | 2/1984 |
| JP | 01-242456 A | 9/1989 |
| JP | 02-073902 | 3/1990 |
| JP | 02-213403 | 8/1990 |
| JP | 11-029767 | 2/1999 |
| JP | 11-315278 A | 11/1999 |
| JP | 2002-275465 A | 9/2002 |
| WO | 2005/028591 A | 3/2005 |
| WO | 2005/110943 A | 11/2005 |
| WO | WO 2005/110943 | * 11/2005 |

OTHER PUBLICATIONS

H. Mordoc, et al., "Large-Band-Gap SiC, III-V Nitride, and II-VI ZnSe-based Semiconductor Device Technologies," Journal of Applied Physics, vol. 76, No. 3, pp. 1363-1398, Aug. 1, 1994.

D. Krus et al., "Precision Linear and Two-dimensional Scintillation Cyrstal Arrays for X-ray and Gamma Ray Imaging Applications," SPIE International Symposium on Optical Sciences, SPIE vol. 3678, 12 pgs, Jul. 18-23, 1999.

JP Office Action dated Feb. 22, 2011 from JP Application No. 2008-523956, 3 pgs.

* cited by examiner

*Primary Examiner* — Carol M Koslow

(74) *Attorney, Agent, or Firm* — Abel Law Group, LLP; Robert N. Young

(57) ABSTRACT

A method of producing a rare earth oxysulfide scintillating ceramic body includes heat treatment to form a consolidated body, followed by gas hot isostatic pressing (GHIPing). A powder is first provided having the general formula $(M_{1-x}Ln_x)_2O_2S$, wherein M is a rare earth element, and Ln is at least one element selected from the group consisting of Eu, Ce, Pr, Tb, Yb, Dy, Sm, and Ho, and $1\times10^{-6}<X<2\times10^{-1}$. The powder is heat treated to form a consolidated body having closed porosity, wherein heat treating is carried out at a temperature $T_{ht}$. The consolidated body is GHIPed to a density not less than 99% of theoretical density, in a GHIPing environment having a temperature $T_{hip}$, where $1100°\ C.<T_{hip}<1500°\ C.$, to thereby form a densified body.

18 Claims, No Drawings

RARE EARTH OXYSULFIDE SCINTILLATOR AND METHODS FOR PRODUCING SAME

CROSS-REFERENCE TO RELATED APPLICATION(S)

This present application is a continuation of Ser. No. 11/488,905, filed Jul. 18, 2006, entitled "Rare Earth Oxysulfide Scintillator and Methods For Producing Same," naming inventors Brian C. LaCourse and Morteza Zandi, which in turn claims priority to U.S. Provisional Application 60/702,330, filed Jul. 25, 2005, entitled "Rare Earth Oxysulfide Scintillator and Methods For Producing Same," naming inventors Brian C. LaCourse and Morteza Zandi, the subject matter of both applications being incorporated herein by reference in their entirety.

BACKGROUND

1. Field of the Disclosure

The present invention relates to scintillating ceramic bodies, particularly, rare earth oxysulfide scintillating ceramic bodies that function to convert radiation such as X-ray radiation into visible light, and methods for forming such ceramic bodies.

2. Description of the Related Art

In fields such as the medical diagnostics and industrial non-destructive inspection, X-ray computed tomography (X-ray CT) has been widely used to characterize a patient or sample under inspection. In the context of X-ray CT, scintillators are employed to receive X-ray radiation and emit visible light in proportion to the incident radiation intensity.

Typically, scintillators are solid state, in the form of a single crystal such as NaI, CsI, and $CdWO_4$. While single crystal scintillators have found widespread acceptance within the X-ray CT industry, the industry has continued to seek alternative polycrystalline scintillators. Polycrystalline ceramic scintillators represent a promising alternative to single crystal scintillators, with advantages such as lower processing costs and shorter processing times (higher throughput), superior material utilization through near-net shape processing, better homogeneity with respect to incorporation of dopants, and access to ceramic processing techniques that may allow for compositional flexibility to achieve novel scintillating compositions that cannot be prepared by growth from a melt/solution processing pathway.

In the context of polycrystalline ceramic scintillators, several different compositional families have been exploited. One family, rare earth oxides having the cubic crystal structure, has the generalized formula $(Gd, Y)_2O_3$: activator. Another class of materials, rare earth oxysulfides are particularly well-suited for highly sensitive radiation detectors including X-ray CT detectors. Rare earth oxysulfides may have the generalized formula $(M_{1-x}Ln_x)O_2S$, where M stands for at least one element from the group of rare earth elements and Ln represents an activator.

Rare earth oxysulfide ceramic scintillators have been produced by several processing pathways. In one, densification takes place through a 'canning' or encapsulation process. In this process, a gas-tight canned or encapsulated body is placed into a hot isostatic pressing (HIP) processing apparatus. Here, encapsulation in a can prior to HIPing is utilized particularly for components having open porosity, commonplace in the context of ceramic compositions that are difficult to densify. That is, ceramic bodies with open porosity generally cannot be properly densified utilizing gas HIPing (GHIPing), as direct application of pressurized gas (without presence of the gas-tight intermediate can) on a porous body generally results in gas penetration and only limited densification.

In a second, distinct processing pathway for forming rare earth oxysulfide scintillators, use has been made of sintering, including pressureless (atmospheric) sintering, low pressure sintering (e.g., 1-20 atm), and hot pressing (particularly with limited pressures). Such approaches have been used in connection with starting materials composed of morphologically controlled powders, such as powders having a high surface area that enables successful densification in low pressure processes, notably pressures lower than utilized in HIPing operations.

Despite successful formation of high density scintillators, the foregoing processing pathways are not without drawbacks. For example, the so-called canning approach is cumbersome and difficult to execute. The gas-tight container or can is difficult to fabricate, and recovery of the densified material within the container is difficult. The sintering approaches utilizing high surface area powders do not suffer from the same disadvantages, but nevertheless are expensive, and may have limited throughput such as in the context of hot pressing. In addition, the precise morphology, particle size distribution and powder surface area must be carefully controlled to ensure proper densification, increasing cost and adding process control challenges.

While not specifically in the context of ceramic scintillators, glass HIPing, in which a molten glass rather than a gas is used to transfer pressure to the material undergoing densification, has been utilized for hard-to-densify ceramic materials. However, glass HIPing has other processing challenges, such as tendency of the glass to penetrate porosity and inhibit proper densification, occurrence of unwanted interactions between the glass and the material, as well as difficulty in material removal following glass HIPing.

As should be clear, there is interest in the development of alternative processing methodologies, as well as novel scintillating bodies formed thereby.

SUMMARY

According to one embodiment, a method of producing a rare earth oxysulfide scintillating ceramic body includes heat treatment to form a consolidated body, followed by gas hot isostatic pressing (GHIPing or gas HIPing herein). A powder is first provided having the general formula $(M_{1-x}Ln_x)_2O_2S$, wherein M is a rare earth element, and Ln is at least one element selected from the group consisting of Eu, Ce, Pr, Tb, Yb, Dy, Sm, Nd, and Ho, and $1 \times 10^{-6} < X < 2 \times 10^{-1}$. The powder is heat treated to form a consolidated body having closed porosity, wherein heat treating is carried out at a temperature $T_{ht}$. The consolidated body is GHIPed to a density not less than 99% of theoretical density, in a GHIPing environment having a temperature $T_{hip}$, where $1100° C. < T_{hip} < 1500° C.$, to form a densified body.

According to another aspect, rare earth oxysulfide scintillating ceramic body is provided. The body has a composition $(M_{1-x}Ln_x)_2O_2S$, wherein M is at least one rare earth element, Ln is at least one element selected from the group consisting of Eu, Ce, Pr, Tb, Yb, Dy, Sm, Nd, and Ho, and $1 \times 10^{-6} < X < 2 \times 10^{-1}$, a density not less than 99% of theoretical density. The body has optical properties such as an afterglow of not greater than 200 ppm at 3 ms, and a light output not less than 1.75 times the light output of the $CdWO_4$ standard.

DESCRIPTION OF THE PREFERRED EMBODIMENT(S)

According to one aspect of the present invention, a method for producing a rare earth oxysulfide scintillating ceramic body begins with the provision of a raw material powder that forms the base composition of the scintillating ceramic body. The powder, having a rare earth oxysulfide composition, has the generalized formula $(M_{1-x}Ln_x)_2O_2S$, where M is at least one rare earth element, and Ln is at least one element selected from the group consisting of Eu, Ce, Pr, Tb, Yb, Dy, Sn, Nd, and Ho. The amount of substitution of Ln for M is generally limited, such as on the order of $1\times10^{-6}<X<2\times10^{-1}$. Ln represents the activator dopant and co-dopant (if present) additives selected from the elements mentioned above. Activator/co-dopant combinations include, for example, Eu/Ce, Eu/Pr, Eu/Tb, and Pr/Ce. Particular working examples have an activator/co-dopant combination of Pr/Ce, and the Tb/Ce combination is also particularly suitable. Further refinements according to certain embodiments may have only an activator, without a co-dopant present.

According to a particular development of one embodiment, the rare earth element is selected from the group consisting of Y, La and Gd. Of the foregoing, Gd is utilized according to examples herein, and form what may be referred to herein as 'GOS' material, gadolinium oxy-sulfide. The base rare earth oxysulfide powder used for processing, such as GOS powder, may be fabricated utilizing appropriate precipitation techniques, known in the literature. For example, sulfur dioxide may be introduced into an aqueous suspension of rare earth oxide, forming a hydrogen sulfite complex solution. Sulfur dioxide may then be removed from the complex during heat treatment, resulting in precipitation of the rare earth sulfite. The precipitate is then generally heat treated in a reducing atmosphere to form a rare earth oxysulfide having the generalized formula noted above. Prior to precipitation, a dopant additive may be incorporated into solution, generally a precursor to the activator (Ln) component of the composition. Additional details are available in the art, such as in U.S. Pat. No. 5,296,163. Alternatively, commercially available GOS powder may be obtained from specialty powder suppliers.

To aid densification, a sintering aid can be added to the rare earth oxysulfide powder prior to further processing. Examples of sintering aid for GOS are LiF and $Li_2GeF_6$. The amount of sintering aid addition can range from up to 1.0%, for example up to about 0.5%. Some embodiments may contain up to about 0.25%. Following the preparation of the selected powder composition, the powder is formed into a powder compact either by cold die pressing, or cold die pressing followed by cold isostatic pressing. Cold isostatic pressing can be used if greater green densities are required. During cold die pressing, the powder is loaded into a die and pressed at pressures between about 3 ksi and 15 ksi, for example. Cold isostatic pressing can be carried out at 10 ksi to 60 ksi.

As a result of cold pressing, a green body is provided that may be handled for subsequent processing operations. According to a particular development of one embodiment, the cold pressed green body is then heat treated to obtain a consolidated body having closed porosity. Consolidation may be carried out by sintering (e.g., pressureless sintering), although particular embodiments take advantage of uniaxial hot pressing. Hot pressing generally utilizes a hot pressing apparatus composed of a die having opposing punches, the die and the opposing punches defining an internal volume for disposition of the green body. Uniaxial forces are applied, typically at a pressure within a range of about 1 ksi, to about 50 ksi, such as within a range of about 1 to 30 ksi, 4 to 20 ksi, and even within a particular range of 4 to 15 ksi. Particular embodiments were processed within a range of 7-15 ksi. Generally, the pressure utilized during hot pressing is selected such that the pressure is sufficient to ensure closed porosity (free of open porosity) in the consolidated body, typically at a density not less than about 90%, such as not less than about 95% of theoretical density. However, excessive pressure is generally avoided, to improve throughput of the hot pressing processing step. For a given hot pressing apparatus, higher pressures are typically achieved through use of samples having reduced cross sectional area (perpendicular to the hot pressing axis), and accordingly, increased pressures require an attendant reduction in sample size. Accordingly, actual ingot sizes manufactured according to the processing techniques disclosed herein may be desirably large, oftentimes taking on geometries that have heretofore not been achievable through conventional hot pressing techniques. Ingots are generally disk-shaped, having a diameter of at least 4", such as at least 5", 6", 7" or higher. Indeed, commercial scale production may be operated at even larger sizes, such as on the order of 8" or larger. Typical processing temperatures ($T_{ht}$) employed during hot pressing typically lie within a range of about 1100° C. to about 1500° C., such as within a range of about 1100° C. to about 1350° C.

The resulting consolidated body or bodies are then subjected to a heat treatment operation to complete densification of the consolidated body to form the rare earth oxysulfide scintillating ceramic body. Here, densification is generally carried out by gas-hot isostatic pressing (GHIPing). The particular use of gas hot isostatic pressing is of particular significance in that bodies having fully closed porosity are a prerequisite for successful processing to full density, generally not less than about 99% of theoretical density, oftentimes not less than about 99.9% of theoretical density.

Gas HIPing, as the term is used herein, is specifically distinguished from other processing techniques such as canning (mentioned above), in that no can or encapsulating member is utilized to exert pressure on the consolidated body. Here, the pressurized gas in the HIPing chamber directly applies pressure to body undergoing densification. Accordingly, while canning may advantageously be effective to density bodies having open porosity (thus avoiding consolidation process steps, such as hot pressing), the above described drawbacks relating to separation of the material from the can, can fabrication and other processing complexities are overcome or attenuated through use of GHIPing.

According to a particular processing parameter of gas hot isostatic pressing, the consolidated body is densified at a relatively low temperature, generally at a temperature $T_{hip}$, where $T_{hip}$ is greater than about 1100° C., and less than 1500° C. This particular GHIPing temperature range is of significance, as temperatures below 1100° C. result in bodies having insufficient density, while bodies GHIPed above 1500° C. generally result in bodies that have compromised mechanical integrity. For example, GHIPing at temperatures above 1500° C. result in unacceptably brittle and fragile components. Indeed, certain embodiments have even further confined GHIPing temperatures $T_{hip}$, such as not greater than 1475° C., 1450° C., 1425° C., or even not greater than 1400° C. For clarification, the GHIPing temperature $T_{hip}$ mentioned herein represents the maximum temperature utilized during GHIPing, and is generally the hold temperature employed during the GHIPing operation.

In addition to the temperature parameters discussed above, the GHIPing environment is generally manipulated to attenuate unwanted reactions with the consolidated body. Accordingly, the GHIPing environment is generally composed principally of an inert gas, such as argon or nitrogen. Gas pressures of the GHIPing environment typically are within a range of 10 to 100 ksi, such as 20 to 50 ksi. Partial pressures of non-inert gases in the GHIPing environment are typically minimized, such as on the order of $10^{-8}$ bar or lower.

As noted above, rare earth oxysulfide materials such as GOS materials have been fabricated by differing pathways according to the state of the art, including sintering processes utilizing high surface area powders, as well as the particular HIPing operation known as canning described above. Other state of the art processing techniques, particularly techniques for densification of oxide-based ceramic scintillators (as opposed to oxysulfide based scintillators, the subject of the present disclosure), have utilized two-step densification procedures. Such two step densification process flows have utilized a combination of heat treatment to form a consolidated body, followed by densification through gas HIPing. However, the processing parameters and particular process flows utilized in the context of non-sulfide based compositions, such as rare earth oxide compositions, have proven to be unusable in the context of rare earth oxysulfide materials such as GOS. Of note, the excessively high temperatures utilized in GHIPing of oxide based compositions result in degradation of mechanical properties of the sulfide-based compositions as described herein.

As noted above, the GHIPing process may take place in an environment principally composed of an inert gas such as argon or nitrogen, but may contain a low partial pressure of non-inert species such as oxygen, and additionally low partial pressures of species of the rare earth oxysulfide material undergoing GHIPing. For example, in the context of oxygen it is not uncommon that the oxygen partial pressure within the GHIPing environment be on the order of $10^{-12}$ bar. A complication that may result under some processing conditions is the attendant reduction of compositional components of the consolidated body during the GHIPing process. Additionally, low partial pressures of elements and complexes of rare earth oxysulfide may lead to unwanted volatilization of species, and create undesirable phase changes in the material. While it may be desirable to conduct gas HIPing in an environment having higher concentrations of oxygen and/or complexes or elements of the rare earth oxysulfide, such highly stylized gaseous environments as applied to the entire GHIPing apparatus are generally not feasible. Accordingly, a localized environment may be created, the localized environment being rich in target species to prevent unwanted reduction reactions and/or volatilization.

Various approaches may be utilized to create a localized environment. In one approach, the consolidated body is provided in a crucible, a refractory container in which workpieces are set for a thermal processing. The crucible generally contains a processing gas source, and defines therein the localized environment. The processing gas source is generally one that releases a desired gaseous species, creating a localized species-rich area. In the context of prevention of reduction of ceramic bodies undergoing gas HIPing, an oxygen gas source is generally provided, usually in powder form. In combination, or alternatively, the processing gas source is composed of a rare earth oxysulfide, typically an oxysulfide containing the same rare earth species as the component undergoing GHIPing treatment. Most typically, the processing gas source contains principally the same base rare earth oxysulfide powder from which the component undergoing HIPing is formed. Since the rare earth oxysulfide powder may be doped during formation (e.g., prior to precipitation) as described above, the powder forming the processing gas source may have the identical dopant profile. Powder form is generally desirable, as the high surface area associated with powders enhance release of the target species. While the components undergoing gas HIPing may be placed on a powder bed composed of the processing gas source, desirable results have been achieved by embedding the component or components within the powder bed.

In the particular context of oxygen-releasing sources, it is preferable that the processing gas source undergoes reduction to establish a desirable oxygen partial pressure within the localized environment, before any appreciable reduction of the ceramic component. The processing gas source generally undergoes reduction more easily than the ceramic body. This ease of reduction is a function of the free energy change of thermochemical reduction and oxidation as a function of temperature, and may be determined by thermodynamic data from the Ellingham Diagram which is provided, for example, in R. A. Swalin, "Thermodynamics of Solids Second Edition," Wiley-Inter Science Publications, page 114 (1972), hereby incorporated by reference. In one sense, the processing gas source acts as a sacrificial GHIPing agent undergoing reduction prior to any appreciable reduction of the ceramic component, thereby creating the desired localized environment and protecting the components undergoing gas HIPing. Generally the localized oxygen partial pressure is greater than the equilibrium oxygen partial pressure of the gas HIPing environment at a given temperature and pressure of the system. Desirably, the partial pressure of oxygen is not less than about 0.1 atm in the localized environment, and in some embodiments, not less than 0.5 atm. In contrast, the HIPing environment has a reduced partial pressure of oxygen, such as on the order $10^{-10}$ atm and lower.

The particular architecture utilized for the creation of a stable localized environment may be achieved in a straightforward manner by nesting inverted crucibles, the inner crucible containing a powder bed in which the component or components are embedded, the outer crucible being oversized and inverted to overlie the inner crucible. An annular through-passage is generally created between the two crucibles to minimize any pressure gradient inside and outside the localized environment, to ensure proper gas HIPing. Generally, the configuration minimizes gas flow during HIPing to stably contain the localized species rich environment, and to attenuate escape of the processing gas species from the crucible and contaminating the HIPing environment. In addition, a gettering species or getterer may be provided in the opening, or adjacent to the opening to getter the processing gas species that would otherwise escape into the HIPing environment. For example, in the case of oxygen processing gas species, the getterer may be a metal that oxidizes in the high temperature HIPing environment upon contact with the oxygen from the gas source.

According to various embodiments, following the creation of a densified ceramic body from the GHIPing step, additional process steps may be carried out. For example, for certain activator/co-dopant combinations, such as the Pr/Ce activator/co-dopant combination, it may be desirable to carry out an annealing step in an oxygen environment such as air. In the particular context of Pr/Ce, Ce is generally added as a co-dopant do reduce afterglow in the scintillators, although other afterglow reducers may be utilized as a suitable co-dopant. As a result of GHIPing, it is believed that the Ce may be in a non-preferential energy level, such as in the +3 energy level believed to be the result of low oxygen partial pressures in the GHIPing environment and/or non-use of an oxygen-liberating powder bed as discussed above. Accordingly, annealing in an oxygen-containing environment, such as an air anneal, can advantageously modify the co-dopant to be in the +4 energy level. Typical annealing conditions include heat treatment at a temperature within a range of about 700° C. to 1500° C., such as 800° C. to 1200° C. Particular examples have been annealed within the range of 900°-1100° C.

Final processing may optionally include machining operations to form desirable geometries for the particular application of the fully densified rare earth oxysulfide scintillating ceramic body. For example, the densified rare earth oxysulfide body may be subjected to grinding and slicing operations to form a plurality of scintillating components or bodies. Typical geometries include blanks or plates, generally rectangular components having dimensions on the order of 10 mm to 50 mm in width, 20 mm to 80 mm in length, 0.25 to 7 mm in thickness. Plates may be further processed into pixels having a comparatively fine dimensions, generally on the order of (0.5 to 10 mm side) by (0.5 to 10 mm side) by (0.2 to 2 mm thickness). Pixels generally have equal length sides forming a square cross section; a particular embodiment has dimensions of 1-2 mm×1-2 mm×1.5 mm.

The following examples illustrate various working embodiments, notably including the formation of rare earth oxysulfide ceramic scintillators, notably gadolinium oxysulfide (GOS) scintillators.

The following table shows the effect of GHIP temperature on the density and handleability of GOS scintillators. Each of the samples below contained 0.06% $Li_2GeF_6$ as a sintering aid. They were then hot pressed at 1220 C, 15 ksi pressure, under vacuum for a hold time of about 2 hours. The subsequent HIP temperature was within a range of 1220 and 1500 C and held at the soak temperature for 1 hr. A suitable HIP temperature for producing a GOS scintillator which has a high density and a good handleability, such as 1400 C. As the HIP temperature is decreased, the density decreases, which will effect the material's transparency and light output. As the HIP temperature increases, significant grain growth occurs and the material becomes very brittle and therefore difficult to handle and machine.

| HIP (° C.) | Density (g/cm3) | Handleability |
|---|---|---|
| 1220 | 7.299 | good |
| 1300 | 7.322 | good |
| 1400 | 7.347 | good |
| 1500 | 7.35 | very brittle |

Characterization of GOS scintillators has revealed desirable performance. For example, embodiments have demonstrated possession of both attenuated afterglow and strong light output, properties that are generally understood to be difficult to achieve in the same sample (e.g., afterglow reducers tend to reduce light output). Actual afterglow values are typically less than 200 ppm, such as less than 150 ppm, less than 100 ppm, less than 90 ppm, and even less than 80 ppm (relative to the original signal) 3 ms after the radiation is turned off (short term afterglow). In addition, samples may have afterglow values less than 20 ppm, such as less than 10 ppm at 500 ms (long term afterglow).

The foregoing afterglow measurements were made based on a light detection utilizing a photomultiplier tube. Additional measurements were carried out with use of a silicon photodiode, which provides additional useful information. Particularly, afterglow at 5 ms was found to be generally below 1000 ppm, with values not greater than 900 ppm, not greater than 800 ppm, 700 ppm, and indeed values below 600 ppm. Embodiments can have a value not greater than 500 ppm. At 20 ms, the afterglow values are notably lower, not greater than 200 ppm, such as not greater than 150 ppm, and several embodiments not greater than 100 ppm, based on silicon photodiode measurement.

Due to intrinsic technical difficulties in measuring actual light output of scintillator bodies, the industry generally measures light output against one of several industry standards. Here, light output has been measured against commercially available $CdWO_4$ (cadmium tungstate) available from Saint-Gobain Crystals, a division of Saint-Gobain Ceramic and Plastics, Inc. Against this standard, in addition to desirably attenuated afterglow, samples have demonstrated light output of greater than 1.75 times the light output of the $CdWO_4$ standard, with particular values not less than 1.9, 2.0, 2.1, 2.2 and even not less than 2.3 times the standard. Light output is partly a function of crystal transparency; the foregoing values represent high crystal transparency, a particularly desirable characteristic of ceramic scintillators.

Microstructural analysis has shown that embodiments have a fine grain size and a desirably tight distribution of grain sizes, with a monomodal grain size distribution unlike certain prior art technologies that produce bimodal distributions (e.g., small needle-like grains and larger quasi-isotropic grains). Here, reference is made to $D_{xx}$, representing the size at which xx % of the grains are smaller. The tightness of a distribution is quantified by the spread between $D_{10}$ and $D_{90}$, indicating the range within which 80% of the particles lie. According to embodiments herein, the $D_{10}$-$D_{90}$ spread may be less than about 120 microns, such as less than about 110 microns. Certain embodiments may have an even tighter spread, such as less than about 100 microns, 90 microns, 80 microns. Indeed embodiments herein may have a $D_{10}$-$D_{90}$ spread less than about 75 microns or even 70 microns. The $D_{10}$-$D_{90}$ spread is generally greater than about 30 microns, oftentimes greater than about 40 microns. Measured $D_{50}$ values generally fall within a range about 20 to 100 microns, such as 30-75 microns. Actual measured values of two samples revealed $D_{50}$ values of 39 and 62 microns.

Dopant (activator/coactivator) distribution according embodiments is believed to be desirably uniform, due at least in part to the achievement of fine grain sizes and $D_{10}$-$D_{90}$ spreads reported above. Such uniformity is particularly desirable, ensuring homogeneous light output and afterglow properties, properties that are particularly important in many of the end use applications of embodiments herein.

Embodiments of the present invention are particularly useful broadly in the context of detection of ionizing radiation. Broad markets or fields of use in which embodiments of the present invention may be useful include a wide array, including geophysical, industrial, medical, physics/research, and security. Detectors incorporating embodiments of the present invention may be utilized in the geophysical market to locate and compositionally analyze minerals, as well as locate oil and gas, for example. The industrial market spans a wide range, including gauging (e.g., measurement of physical parameters such as thickness, density and level), health physics (e.g., measurement of ionizing radiation for safety and protection of workers), materials analysis (e.g., provision of elemental content and physical structure of materials), non-destructive testing (e.g., detection of flaws or cracks in materials, density variation, elemental composition and alloy analysis in areas such as metal welds, printed circuit boards, automotive and truck tires, frozen and fresh food, for example), and safeguards (e.g., radiation sensors to prevent accidental or deliberate transport of radioactive materials beyond certain points). The medical industry utilizes radiation detectors in radioimmunoassay (RIA), bond mineral densitometry (BMD), thyroid uptake scanners and other diagnostic services. The medical field also includes nuclear medicine in which unique imaging is generated to provide information about organ function, for example. The physics/ research field oftentimes takes advantage of custom-built scintillation detectors for a wide variety of uses, such as calorimetry, astrophysics, dark matter detection and intermediate energy spectroscopy. The security field continues to grow rapidly with particular uses in the context of x-ray or gamma-ray scanners utilizing transmitted and back scattered radiation to reveal objects and materials hidden in baggage, vehicles, cargo containers, and the like.

In addition to the general fields of use of embodiments of the present invention as detailed above, embodiments may be deployed in quite a wide variety of specific applications. Such applications include aerial survey, alpha detection, baggage scanners, beta detection, bone mineral densitometry, calorimetry, Compton's suppression, container scanners, density/thickness gauging, field spectrometry, flash radiography, food inspection, gamma ray detection, level-fill gauging, neutron activation, neutron counting, neutron detection, oil exploration, portal/vehicle, PET, production inspection, radioimmunoassay, SPECT, SNM identification, therapy imaging, thyroid scanning, computed tomography (CT), whole body monitors, wipe testing, and x-ray detection.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A rare earth oxysulfide scintillating ceramic body having a composition $(M_{1-x}Ln_x)_2O_2S$, wherein M is at least one rare earth element, Ln is at least one element selected from the group consisting of Eu, Ce, Pr, Tb, Yb, Dy, Sm, Nd, and Ho, and $1\times10^{-6}<X<2\times10^{-1}$, the body having a density not less than 99% of theoretical density, an afterglow below 1000 ppm at 5 ms, and a light output of greater than 1.75 times the light output of the $CdWO_4$ standard.

2. The rare earth oxysulfide scintillating ceramic body of claim 1, having an afterglow of not greater than 900 ppm at 5 ms.

3. The rare earth oxysulfide scintillating ceramic body of claim 2, having an afterglow of not greater than 700 ppm at 5 ms.

4. The rare earth oxysulfide scintillating ceramic body of claim 1, having a light output not less than 2.2 times the light output of the $CdWO_4$ standard.

5. The rare earth oxysulfide scintillating ceramic body of claim 1, having a light output not less than 1.9 times the light output of the $CdWO_4$ standard.

6. The rare earth oxysulfide scintillating ceramic body of claim 1, wherein M is selected from the group consisting of Y, La, and Gd.

7. The rare earth oxysulfide scintillating ceramic body of claim 6, wherein M is Gd.

8. The rare earth oxysulfide scintillating ceramic body of claim 1, wherein Ln contains at least Pr or Tb.

9. The rare earth oxysulfide scintillating ceramic body of claim 8, wherein Ln further contains Ce.

10. A rare earth oxysulfide scintillating ceramic body having a composition $(M_{1-x}Ln_x)_2O_2S$, wherein M is at least one rare earth element, Ln is at least one element selected from the group consisting of Eu, Ce, Pr, Tb, Yb, Dy, Sm, Nd, and Ho, and $1\times10^{-6}<X<2\times10^{-1}$, the body having a density not less than 99% of theoretical density, an afterglow below 1000 ppm at 5 ms as measured with a silicon photodiode, and a light output of greater than 1.75 times the light output of the $CdWO_4$ standard.

11. The rare earth oxysulfide scintillating ceramic body of claim 10, having an afterglow of not greater than 900 ppm at 5 ms.

12. The rare earth oxysulfide scintillating ceramic body of claim 11, having an afterglow of not greater than 700 ppm at 5 ms.

13. The rare earth oxysulfide scintillating ceramic body of claim 10, having a light output not less than 2.2 times the light output of the $CdWO_4$ standard.

14. The rare earth oxysulfide scintillating ceramic body of claim 10, having a light output not less than 1.9 times the light output of the $CdWO_4$ standard.

15. The rare earth oxysulfide scintillating ceramic body of claim 10, wherein M is selected from the group consisting of Y, La, and Gd.

16. The rare earth oxysulfide scintillating ceramic body of claim 15, wherein M is Gd.

17. The rare earth oxysulfide scintillating ceramic body of claim 10, wherein Ln contains at least Pr or Tb.

18. The rare earth oxysulfide scintillating ceramic body of claim 17, wherein Ln further contains Ce.

* * * * *